Dec. 14, 1971   K. W. DUDLEY   3,627,488

CORROSION- AND EROSION-RESISTANT MATERIAL

Filed July 7, 1969

INVENTOR
KENNETH W. DUDLEY
BY
AGENT 3,627,488
CORROSION- AND EROSION-RESISTANT
MATERIAL
Kenneth W. Dudley, Sudbury, Mass., assignor to
Raytheon Company, Lexington, Mass.
Filed July 7, 1969, Ser. No. 839,352
Int. Cl. B32b 15/20
U.S. Cl. 29—199    3 Claims

ABSTRACT OF THE DISCLOSURE

A metallic material, such as copper, having a diffused surface which is highly resistant to corrosion and erosion, and method of making same.

BACKGROUND OF THE INVENTION

Many metals are employed in environments where they are subject to extreme corrosion and/or erosion. In some cases the corrosion may be caused by incompatible atmospheres to which the metal is subjected, such as rusting of iron when exposed to dampness, for example. Erosion often occurs when the metal is subjected, for example, to constant high pressure bursts or constant flow of fluids. Illustratively, in high frequency electron discharge devices which employ small diameter tubing, the tubing is cooled by directing through it a flow of highly turbulent water or other fluid coolant at high velocity. Many other instances also may be found where high heat flux from metal to water is used, such as in the nuclear reactor field, for example.

Copper is a particularly good example of a material which is desirable for use in electronic devices and systems because of its excellent electrical and thermal conductivity. In high frequency microwave tubes, for example, cooling is achieved by the flow of water through copper tubing. However, as the frequency goes up, the size of the tubing must be decreased. Therefore, to maintain a desired level of heat dissipation, it is necessary to use highly turbulent and high velocity cooling. Such forces acting upon tubing which is heated on the outside and cooled on the inside can destroy or seriously damage the tubing in a matter of minutes.

Such damage or destruction will likewise occur in structures other than tubing. For example, the element may comprise a solid conductor having several capillary holes through it, or it may comprise an extruded vane, or other configuration.

Monel, a copper nickel alloy wherein nickel is predominant, has improved erosion and corrosion resistance. However, Monel is a relatively poor thermal and electrical conductor. This has led to copper-clad Monel with its own set of problems such as poor bonding, greater expense and difficulty in quality controlling. Platings to overcome erosion and corrosion are very susceptible to peeling and are thus unreliable.

An additional difficulty exists with copper used in vacuumized devices because the vacuum integrity of heated copper, such as tubes using very thin wall copper parts, may deteriorate or be destroyed by the fact that the grain boundaries in the heated copper may extend from the vacuum to the outside.

SUMMARY OF THE INVENTION

The foregoing and other disadvantages of the prior art are overcome by the present invention wherein a metal part of copper, iron, nickel or Monel is provided with a surface which is highly resistant to erosion and/or corrosion. This is achieved by diffusing gold, nickel, platinum or palladium into the surface to form a layer which will resist corrosion or erosion whereby the part will be provided with a life many times longer than is possible in the absence of the layer. The layer may be formed by first thoroughly cleaning the metal part, plating the diffusant onto the surface to be treated, then heating the plated part to brazing temperatures for a time sufficient to cause the diffusant to diffuse into the base metal to form a surface layer comprising a solid solution wherein the diffusant will break up the grain boundaries at the surface.

Plating may be accomplished by any known method such as electroplating or by an immersion technique comprising pumping a heated (about 90° C.) plating solution through the tubing or over the surface of the part for several minutes. In the latter process, the plating thickness will generally be in the order of 3–10 millionths of an inch, and subsequent firing will then cause rapid diffusion of the plating material into the metal to produce a layer about one-thousandth of an inch thick. When using the immersion technique, it will be necessary to plate and fire the part a second time, or even more, to produce a satisfactory resistant layer.

DESCRIPTION OF THE PREFERRED EMBODIMENTS

Figure 1:
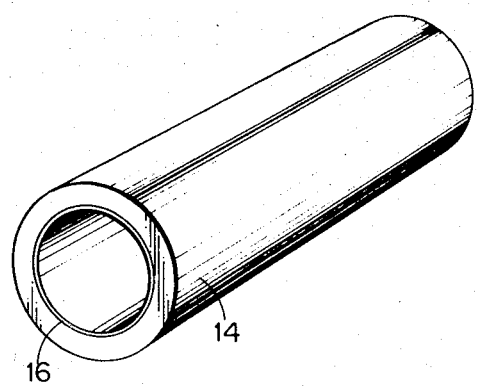
FIG. 1 is an isometric view of a metal tube having a resistant coating on its inner surface, in accordance with this invention.

Referring to the drawings, in FIG. 1 there is shown a tube or pipe 14 of metal having an inner surface layer 16 thereon which is highly resistant to erosion and/or corrosion in accordance with this invention. The tube or pipe 14 may be copper, nickel, iron or nickel-copper alloy such as Monel. Monel is an alloy of nickel and copper wherein nickel predominates in a proportion of 55 to 45 up to as much as 70 to 30.

The layer 16 comprises gold, nickel, platinum or palladium diffused into the metal surface to a depth sufficient to resist the rigorous environment to which the surface is to be subjected. For example, layer 16 may be about 1–3 thousandths of an inch in thickness for most purposes where the surface is to be subjected when the tube is heated, to a turbulent flow of water under high velocity. However, the layer 16 may be thicker or thinner, as desired.

Layer 16 is formed by first thoroughly cleaning the surface which is to receive the layer 16. Such cleaning may be done by any suitable process such as chemically cleaning and then firing the surface in a reducing atmosphere to about 850° C. The heating of the surface before plating is essential to provide a surface clean enough for subsequently obtaining a good gold plate.

After cleaning, the surface is plated with the diffusant material. Plating may be done, when convenient, by well known electroplating processes to provide on the surface of the metal tube 14 a coating or layer of diffusant which may be, for example, .1–.5 mil in thickness. Where electroplating is not convenient, such as when plating the inner surfaces of relatively small diameter tubing, for example, the plating may be done by an immersion technique which involves pumping the plating solution, which is maintained at a temperature of about 90° C., through the tubing for 10–15 minutes. This will provide a plating having a thickness in the order of about 3–10 millionths of an inch. The tubing is then rinsed.

After plating. the part plated with gold, for example, is heated at about 850° C. for about 10–15 minutes, during which time the gold will diffuse into the surface to form a gold-copper solid solution. When using the immersion plating technique, to provide a satisfactory layer 16 about one-thousandth of an inch thick, second plating and heating steps will be required because of the thin plates which are provided by such a plating technique.

The length of the diffusion heating cycle may be varied, however, depending upon the diffusant and base materials being used. The diffusion of gold into copper is rapid, so after firing at about 850° C. for 10–15 minutes, the layer 16 will be about one-thousandth of an inch thick.

In one example, a copper tubing 14 (FIG. 1) having an outside diameter of about .105″ and an inside diameter of about .033″ was provided with a diffused gold layer 16 about one-thousandth of an inch thick on its inner surface by the method described above. This tubing was run at red heat on the outside while being cooled with high velocity water forced through its interior. The gold diffusion layer 16 showed no signs of erosion after twelve hours of this severe test. However, ordinary copper tubing without the layer 16 would be seriously damaged by oxidation and erosion after only a few minutes under the same test.

Figure 2:
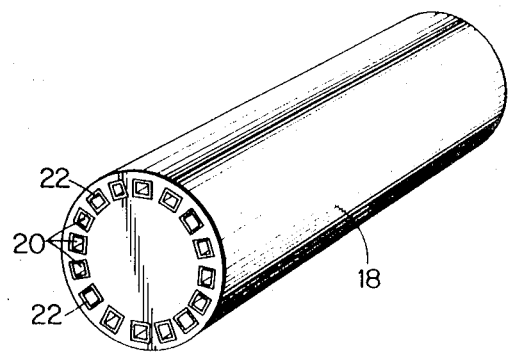
FIGS. 2–4 are isometric views of metal parts of different configurations, each embodying the present invention, FIG. 4 being partly in axial section.

In another example, a single copper conductor 18 (FIG. 2) was provided with a plurality of capillary holes 20 therethrough. The surfaces defining the holes 20 were provided with gold diffusion layers 22 as described above. Layers 22 resist erosion in the same manner as in the single channel tubing 14.

Figure 3:
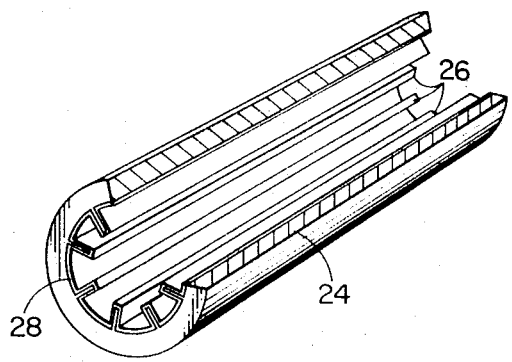

In a still further embodiment of the invention a tubing 24 (FIG. 3) has a plurality of radial inwardly extending vanes 26 arranged on its inner surface and extending longitudinally of the tubing in spaced relation with one another. The vanes may be straight or may be arranged in a spiral fashion to provide turbulence in the flow of a coolant through the tubing. In any event, the surfaces of the vanes 26 and the inner surfaces of the tubing intermediate the vanes are provided with gold diffusion layers 28 in the manner set forth above. Such layers 28 provide the tubing and vanes with greatly improved erosion resistance in accordance with this invention.

Figure 4:
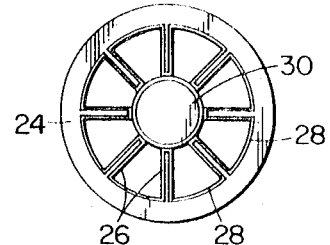

In the structure shown in FIG. 4, after the diffusant coating has been plated onto the vanes 26, the tubing 24 will be drawn over a copper mandrel 30 which has been similarly plated and which may constitute the central or core portion of a structure which appears as shown in FIG. 4. The device is then heated to the temperature required for diffusing the gold or other diffusant material into the surfaces, and at the same time the mandrel 30 will become bonded to the vanes 26 by the diffusant.

It has been found that a diffusion layer in accordance with this invention will also improve the vacuum integrity of tubes using very thin wall copper parts since the diffusion layer will break up the grain boundaries at the surface.

It will be understood that although gold has been predominantly specified in the foregoing description as the diffusant in the various examples given, nickel, platinum or palladium alternatively may be used as the diffusant. It is expected that the plating thickness and the thickness of the resulting diffused layers will be substantially as described in connection with gold. However, the time-temperature cycles will vary, depending upon the particular diffusant and base metal used. It is well known, for instance that nickel, platinum and palladium all diffuse into copper, for example, at a slower rate than gold. Therefore, the time cycle in such cases must be lengthened to compensate for such slower rates of diffusion. Likewise, these same diffusants will diffuse into nickel, Monel and iron at a slower rate than into copper.

From the foregoing it will be apparent that all of the objectives and advantages of this invention are achieved by the structures and methods shown and described. It will also be apparent that certain changes and modifications may be made by those skilled in the art without departing from the spirit of the invention as expressed in the accompanying claims.

What is claimed is:

1. An article of manufacture comprising a member of copper for use in an elevated temperature environment and having a surface which is subjected to abrasive flow of a coolant for dissipation of heat from the member, said surface comprising a layer of a solid solution of gold and copper for providing the surface with improved corrosion-erosion resistance.

2. An article of manufacture as set forth in claim 1 wherein said layer is formed by the diffusion of gold into said surface.

3. An article of manufacture as set forth in claim 1 wherein said layer is at least one-thousandth of an inch in thickness.

References Cited

UNITED STATES PATENTS

| | | | |
|---|---|---|---|
| 1,929,252 | 10/1933 | Morris | 148—31.5 |
| 3,157,539 | 11/1964 | Dreher | 148—127 |
| 3,234,056 | 2/1966 | Kraft et al. | 148—16 |

L. DEWAYNE RUTLEDGE, Primary Examiner

E. L. WEISE, Assistant Examiner

U.S. Cl. X.R.

29—194, 196.6; 117—62; 165—133